(12) United States Patent
Liang et al.

(10) Patent No.: US 10,749,184 B2
(45) Date of Patent: *Aug. 18, 2020

(54) BATTERY

(71) Applicant: Contemporary Amperex Technology Co., Limited, Ningde, Fujian Province (CN)

(72) Inventors: Chengdu Liang, Ningde (CN); Huafeng Huang, Ningde (CN); Qisen Huang, Ningde (CN)

(73) Assignee: Contemporary Amperex Technology Co., Limited (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,428

(22) Filed: Jul. 17, 2019

(65) Prior Publication Data

US 2019/0341622 A1 Nov. 7, 2019

Related U.S. Application Data

(63) Continuation-in-part of application No. 16/161,978, filed on Oct. 16, 2018.

(30) Foreign Application Priority Data

Dec. 5, 2017 (CN) .......................... 2017 1 1268374
Apr. 26, 2019 (CN) .......................... 2019 1 0345708

(51) Int. Cl.
 *H01M 4/66* (2006.01)
(52) U.S. Cl.
 CPC .......... *H01M 4/667* (2013.01); *H01M 4/661* (2013.01); *H01M 4/664* (2013.01); *H01M 4/668* (2013.01)

(58) Field of Classification Search
 None
 See application file for complete search history.

(56) References Cited

U.S. PATENT DOCUMENTS

| 7,099,142 B2 | 8/2006 | Otsuki et al. |
| 7,794,883 B2 | 9/2010 | Matsumura et al. |
| 8,399,113 B2 * | 3/2013 | Nakura ................. H01M 2/348 |
| | | 429/163 |

(Continued)

FOREIGN PATENT DOCUMENTS

| CN | 107123812 A | 9/2017 |
| CN | 107369810 A | 11/2017 |

(Continued)

*Primary Examiner* — Rena Dye Cronin
(74) *Attorney, Agent, or Firm* — Forge IP, PLLC

(57) ABSTRACT

A battery is provided in the present disclosure. The battery includes: a positive electrode plate including a positive current collector and a positive active material layer; a negative electrode plate including a positive current collector and a negative active material layer; and an electrolyte. The positive current collector includes an insulation layer used to support a conductive layer and the conductive layer used to support the positive active material layer and located above at least one surface of the insulation layer. The conductive layer has a thickness of D2 which satisfies: 300 nm≤D2≤2 µm. A protective layer is arranged on at least one surface of the conductive layer. The negative current collector is a copper foil current collector having a thickness of 1 µm to 5.9 µm.

20 Claims, 4 Drawing Sheets

(56) References Cited

U.S. PATENT DOCUMENTS

| | | |
|---|---|---|
| 8,669,010 B2 | 3/2014 | Torata et al. |
| 2010/0119940 A1 | 5/2010 | Okano et al. |
| 2011/0052985 A1* | 3/2011 | Kashiwazaki ......... H01G 11/38 |
| | | 429/217 |
| 2011/0200884 A1 | 8/2011 | Uchida |
| 2012/0052378 A1* | 3/2012 | Torata .................... H01M 4/13 |
| | | 429/209 |
| 2013/0017441 A1* | 1/2013 | Affinito ............... H01M 2/1673 |
| | | 429/211 |
| 2017/0309951 A1* | 10/2017 | Ishikawa ................. H01M 2/34 |
| 2018/0301709 A1 | 10/2018 | Qiu |

FOREIGN PATENT DOCUMENTS

| | | |
|---|---|---|
| CN | 206849947 U | 1/2018 |
| JP | 9-022722 A | 1/1997 |
| JP | 9-120818 A | 5/1997 |
| JP | 2004273304 A | 9/2004 |
| JP | 2010118175 A | 5/2010 |
| JP | 2010118258 A | 5/2010 |
| JP | 2015118865 A | 6/2015 |
| WO | WO0042669 A1 | 7/2000 |
| WO | WO0221631 A1 | 3/2002 |
| WO | WO2005076392 A1 | 8/2005 |
| WO | WO2009131184 A1 | 10/2009 |
| WO | WO2012081368 A1 | 6/2012 |
| WO | WO2012102220 A1 | 8/2012 |
| WO | WO2015041167 A1 | 3/2015 |

\* cited by examiner

BATTERY

CROSS-REFERENCE TO RELATED APPLICATIONS

The present application is a continuation-in-part of U.S. application Ser. No. 16/161,978, filed on Oct. 16, 2018, which claims priority to Chinese Patent Application No. 201711268374.1, filed on Dec. 5, 2017, the content of which is incorporated herein by reference in its entirety; and the present application also claims priority to Chinese Patent Application No. 201910345708.3, filed on Apr. 26, 2019, the content of which is incorporated herein by reference in its entirety.

TECHNICAL FIELD

The present disclosure relates to the field of batteries and, particularly, relates to a battery.

BACKGROUND

Lithium ion batteries have been widely used in electric vehicles and consumer electronics due to their advantages such as high energy density, high output power, long cycle life, and low environmental pollution. However, when the lithium ion batteries are subjected to abnormal conditions such as extrusion, collision, or puncture, they can easily to catch fire or explode, causing serious problems. Therefore, the safety issue of the lithium ion batteries greatly limits the application and popularization of the lithium ion batteries.

A large number of experimental results show that an internal short circuit in a battery is the ultimate cause of safety hazards of the lithium ion batteries. In order to avoid the internal short circuit in the battery, researchers tried to improve the separator structure, battery mechanical structure and so on. Some of these studies have improved the safety performance of the lithium ion batteries by modifying the design of current collectors.

The temperature in the battery may rise when an internal short circuit occurs in the battery due to abnormal conditions such as collision, extrusion, or puncture and on the like. According to a technical solution in the related art, there is a technical solution in which alloy having a low melting point is added into the material of a metal current collector. With increasing of the temperature of the battery, the alloy having low-melting point in the current collector begins to melt, thereby resulting in a broken circuit of an electrode plate and cutting off the current. In this way, the safety of the battery is improved. According to another technical solution in the prior art, a multilayered current collector is adopted, in which both sides of a resin layer are connected with metal layers to form a composite. When the temperature of the battery reaches a melting point of the material of the resin layer, the resin layer of the current collector melts to damage the electrode plate, thereby cutting off the current and enhancing the safety of the battery.

However, these solutions in the related art cannot effectively prevent the occurrence of the internal short circuit in the lithium ion battery, and cannot guarantee that the battery can continue to operate under the abnormal conditions. In the above solutions, the temperature in the battery would still rise sharply after the internal short circuit occurs in the battery. When the battery temperature rises sharply, danger of varying degrees would still occur if the safety component cannot respond quickly. In these solutions, even the safety component responds and successfully avoids the hazard of the battery, the battery cannot continue to operate.

Therefore, it is necessary to provide a design of a battery that can effectively prevent accidents such as firing and explosion caused by the occurrence of the internal short circuit under the abnormal conditions such as collision, extrusion, or puncture, without affecting the normal operation of the battery.

SUMMARY

The present disclosure provides a battery, which can improve safety performance while having good rate performance.

In a first aspect of the present disclosure, a battery is provided. The battery includes a positive electrode plate, a negative electrode plate and an electrolyte. The positive electrode plate includes a positive current collector and a positive active material layer. The negative electrode plate includes a negative current collector and a negative active material layer, and an electrolyte. The positive current collector includes an insulation layer and at least one conductive layer. The insulation layer is used to support the at least one conductive layer. Each of the at least one conductive layer is used to support the positive active material layer and is located above at least one surface of the insulation layer. Each of the at least one conductive layer has a thickness of D2 satisfying: 300 nm≤D2≤2 μm. At least one protective layer is arranged on at least one surface of each of the at least one conductive layer. The negative current collector is a copper foil current collector having a thickness of 1 μm to 5.9 μm.

The technical solution of the present disclosure has at least the following beneficial effects.

Firstly, the insulation layer of the positive current collector in the battery of the present disclosure is non-conductive, so its resistance is large. This can improve the short circuit resistance of the battery when the short circuit occurs under abnormal conditions, such that the short circuit current can be greatly reduced, and thus the heat generated by the short circuit can be greatly reduced, thereby improving the safety performance of the battery. Meanwhile, the weight energy density of the battery can be increased by replacing the conventional current collector of metal foil with an insulation layer provided with a conductive layer having a smaller thickness.

Secondly, a protective layer is further arranged above the positive current collector in the battery of the present disclosure. On one hand, the conductive layer can ensure that the current collector can provide electrons to the electrode active material layer, that is, it has the effects of conduction and current collection. On the other hand, the protective layer can further improve the overall mechanical strength of the current collector, further improve the safety performance of the battery, and at the same time effectively prevent the conductive layer from being damaged, oxidized or corroded, etc., and thus significantly improve an operating stability and a service life of the current collector.

Finally, although the positive current collector of the battery according to the present disclosure can improve the safety performance of the battery, its conductivity is inferior to that of the conventional current collector of aluminum foil. Therefore, the present disclosure uses a copper foil current collector having a thickness of 1 μm to 5.9 μm as the negative current collector of the battery. Therefore, the rate performance of the battery can be ensured and the negative electrode can be prevented from precipitating lithium.

The battery in the present disclosure can not only improve the safety performance of the battery, but also have the good rate performance, and can also improve the weight energy density of the battery.

Figure 1:
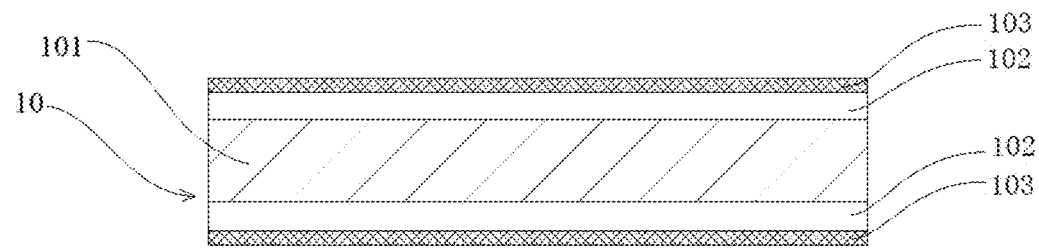
FIG. 1 is a structural schematic diagram of a positive current collector according to an embodiment of the present disclosure.

in which:
1—positive electrode plate;
10—positive current collector;
101—positive insulation layer;
102—positive conductive layer;
103—positive protective layer;
11—positive active material layer;
2—negative electrode plate;
20—negative current collector;
21—negative active material layer;
3—separator;
4—nail.

DESCRIPTION OF EMBODIMENTS

Hereafter, the present disclosure will be further described in combination with specific embodiments. It should be understood that these embodiments are only for illustrating the present disclosure and do not limit the scope of the present disclosure.

The structure and performance of the battery proposed in the embodiments of the present disclosure will be described in detail below.

The embodiments of the present disclosure relate to a battery including a positive electrode, a separator, a negative electrode, and an electrolyte.

The positive electrode plate includes a positive electrode collector and a positive active material layer. The positive current collector in the battery of the embodiments of the present disclosure will be described in detail below.

The positive current collector in the battery of the embodiments of the present disclosure includes an insulation layer and a conductive layer. The insulation layer is used to support the conductive layer and the conductive layer is used to support the positive active material layer and located above at least one surface of the insulation layer. The conductive layer has a thickness of D2 which satisfies: 300 nm≤D2≤2 µm.

The conductive layer in the positive current collector used in the embodiments of the present disclosure, on one hand, can meet the requirement that the current collector provides electrons for the electrode active material layer and thus have a function of conducting and collecting current, thereby improving mechanical strength of the current collector as a whole. On the other hand, the conductive layer has a thickness of D2 which satisfies: 300 nm≤D2≤2 µm.

The internal resistance of the battery usually includes an ohmic internal resistance of the battery and a polarization internal resistance of the battery. An active material resistance, a current collector resistance, an interface resistance, an electrolyte composition and the like may all have a significant influence on the internal resistance of the battery. When a short circuit occurs under abnormal conditions, the internal resistance of the battery may be greatly reduced due to the occurrence of an internal short circuit. Therefore, increasing the resistance of the current collector can increase the internal resistance of the battery after the short circuit, thereby improving safety performance of the battery. In existing lithium ion batteries, when an internal short circuit occurs in the battery under abnormal conditions, a large current would be instantaneously generated, and a large quantity of heat is generated by the short circuit accordingly. The heat may usually further initiate aluminothermal reaction at the positive current collector made of aluminum foil, which may further cause the battery to fire, explode, etc.

In the embodiments of the present disclosure, the above technical problems are solved by using a special current collector in which an insulation layer is used to support and a conductive layer with a specific thickness is included. In the positive current collector of the embodiment of the present disclosure, the insulation layer is non-conductive, so its resistance is large. This can improve the short circuit resistance of the battery when the short circuit occurs under abnormal conditions, such that the short circuit current can be greatly reduced, and thus the heat generated by the short circuit can be greatly reduced, thereby improving the safety performance of the battery. Meanwhile, the specific thickness in the present disclosure can further allow the current collector to have a larger resistance. When the conductive layer is made of aluminum, the aluminothermal reaction of the positive current collector can also be significantly reduced, which significantly reduces temperature rise of the battery during the internal short circuit, thereby leading to a good safety performance for the battery.

In some embodiments, the material of the insulation layer is selected from organic polymer insulation materials. The organic polymer has a lower density and a lighter weight than metal, and therefore the battery can be further allowed to have a higher weight energy density. In addition, the conductive layer uses the metal layer having a smaller thickness so that the weight energy density of the battery can be further increased. In addition, since the insulation layer can well support and protect the conductive layer arranged on the surface thereof, a breakage of the electrode plate, which is common in the conventional current collector, is unlikely to occur.

The organic polymer insulation material is selected from a group consisting of polyamide (abbreviated as PA), polyethylene terephthalate (abbreviated as PET), polyimide (abbreviated as PI), and polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, ethylene propylene rubber (abbreviated as PPE), polyformaldehyde (abbreviated as POM), phenol-formaldehyde resin, polytetrafluoroethylene (abbreviated as PTFE), silicone rubber, polyvinylidene fluoride (abbreviated as PVDF), polycarbonate (abbreviated as PC), or a combinations thereof.

In the current collector according to the embodiments of the present disclosure, the insulation layer mainly plays a role of supporting and protecting the conductive layer. The thickness of the insulation layer is D1, and D1 satisfies 1 µm≤D1≤20 µm. If the insulation layer is too thin, it is likely to be broken during the processing process of the electrode plate or the like. If the insulation layer is too thick, a volume energy density of the battery adopting the current collector can be reduced.

An upper limit of the thickness D1 of the insulation layer can be 20 µm, 15 µm, 12 µm, 10 µm, or 8 µm, and a lower limit of the thickness D1 of the conductive layer can be 1 µm, 1.5 µm, 2 µm, 3 µm, 4 µm, 5 µm, 6 µm, or 7 µm. The thickness D1 of the insulation layer can be in a range consisting of any one upper limit and any one lower limit. Preferably 2 µm≤D1≤10 µm, and more preferably 2 µm≤D1≤6 µm.

If the conductive layer is too thin, although it is beneficial to increase the room temperature thin film resistor $R_S$ of the current collector, it is easily damaged during processing process of the electrode plate or the like. If the conductive layer is too thick, it may affect the weight energy density of the battery, and may not be conductive to increasing the room temperature thin film resistor $R_S$ of the conductive layer.

An upper limit of the thickness D2 of the conductive layer can be 2 µm, 1.8 µm, 1.5 µm, 1.2 µm, 1 µm, 900 nm, 800 nm, 700 nm, 600 nm, or 500 nm, and a lower limit of the thickness D2 of the conductive layer can be 300 nm, 350 nm, 400 nm, or 450 nm. The thickness D2 of the conductive layer can be in a range consisting of any one upper limit and any one lower limit. Preferably, 500 nm≤D2≤1.5 µm.

In some embodiments, the material of the conductive layer is selected from metallic conductive materials, and preferably selected from at least one of aluminum, copper, nickel, titanium, silver, nickel-copper alloy, or aluminum-zirconium alloy.

Further, the conductive layer is preferably made of metallic aluminum. The aluminum content in the conventional positive current collector is high, so when a short circuit occurs in the battery under the abnormal conditions, the heat generated at the short circuit point can initiate a violent aluminothermal reaction, thereby generating a large amount of heat and causing the explosion or other accidents of the battery. When the battery of the present disclosure is used, since the content of aluminum in the positive current collector is greatly reduced, the aluminothermal reaction can be avoided, thereby significantly improving safety performance of the battery.

The conductive layer can be formed on the insulation layer by means of at least one of mechanical rolling, bonding, vapor deposition, and electroless plating. The vapor deposition is preferably physical vapor deposition (PVD). Preferably, the physical vapor deposition is at least one of evaporation deposition and sputtering deposition. The evaporation deposition is preferably at least one of vacuum evaporation, thermal evaporation deposition, or electron beam evaporation method (EBEM). The sputtering deposition is preferably magnetron sputtering.

In the embodiments of the present disclosure, the positive current collector further includes a protective layer arranged on at least one surface of the conductive layer. The protective layer can improve the mechanical strength of the conductive layer, further improve the safety performance of the battery, and at the same time effectively prevent the conductive layer from being damaged, oxidized or corroded, etc., and significantly improve an operating stability and a service life of the current collector.

In the embodiments of the present disclosure, the material of the protective layer is selected from metal oxides, and preferably selected from at least one of aluminum oxide, cobalt oxide, chromium oxide, and nickel oxide.

The thickness of the protective layer is D3, and D3 satisfies: D3≤1/10 D2 and 1 nm≤D3≤200 nm, and preferably 10 nm≤D3≤50 nm.

An upper limit of the thickness D3 of the protective layer can be 200 nm, 180 nm, 150 nm, 120 nm, 100 nm, 80 nm, 60 nm, 55 nm, 50 nm, 45 nm, 40 nm, 30 nm, or 20 nm. A lower limit of the thickness D3 of the protective layer can be 1 nm, 2 nm, 5 nm, 8 nm, 10 nm, 12 nm, 15 nm, or 18 nm. The thickness D3 of the protective layer can be in a range consisting of any one upper limit and any one lower limit. Preferably, 10 nm≤D3≤50 nm. If the protective layer is too thin, it is not enough to protect the conductive layer; and if the protective layer is too thick, the weight energy density and volume energy density of the battery can be reduced.

From the viewpoint of an accounting proportion of the protective layer in the entire thickness of the conductive layer, D3 satisfies: 1/2000 D2≤D3≤1/10 D2, that is, the thickness of the protective layer is 1/2000 to 1/10 of D2, and more preferably, D3 satisfies: 1/1000 D2≤D3≤1/10 D2.

In some embodiments, the protective layer can be arranged on the surface of the conductive layer facing away from the insulation layer. In the embodiments of the present disclosure, for convenience of description, when the protective layer is arranged on the surface of the conductive layer facing away from the insulation layer, i.e., the upper surface of the conductive layer, it may be referred to as an upper protective layer.

The thickness of the upper protection layer is D3', and D3' satisfies: D3'≤1/10 D2 and 1 nm≤D3'≤200 nm, i.e., the thickness of the upper protection layer is smaller than or equal to 1/10 of the thickness D2 and is in a range of 1 nm to 200 nm.

When the upper protective layer is made of a metal oxide, the upper protective layer has a large resistance, so such protective layer can further increase the resistance of the positive current collector to some extent, thereby further improving the short circuit resistance of the battery when a short circuit occurs under abnormal conditions and thus improving safety performance of the battery. Secondly, since the metal oxide has low ductility and high hardness, the upper protective layer can further increase the mechanical strength of the positive current collector. Thirdly, the specific surface area of the metal oxide is larger than that of the metal, such that a bonding force between the protective layer made of the metal oxide material and the conductive layer is stronger, and the protective layer can better protect the conductive layer. Moreover, the bonding force between the protective layer having a larger specific surface area and the positive active material layer can be further increased. Therefore, compared with the current collector having no protective layer arranged thereon or having the upper protective layer made of metal, the current collector according to the embodiments of the present disclosure can further increase the bonding force with the positive active material layer, thus the overall strength of the battery can be improved.

In some embodiments, the protective layer can also be arranged on the surface of the conductive layer facing the insulation layer. When the protective layer is arranged on the surface of the conductive layer facing the insulation layer, i.e., the lower surface of the conductive layer, it may be referred to as a lower protective layer.

The lower protective layer can form a complete support structure to protect the conductive layer, so as to better protect the conductive layer, thereby preventing the conductive layer from being oxidized, corroded or damaged. In addition, the mechanical strength of the current collector is further enhanced. The lower protective layer of the metal oxide material has a large resistance, therefore this type of protective layer can further increase the resistance of the positive current collector to some extent, thereby further improving the short circuit resistance when the short circuit occurs in the battery under the abnormal conditions, and improving safety performance of the battery. In addition, since the specific surface area of the metal oxide is larger, a bonding force between the protective layer made of the metal oxide and the insulation layer is enhanced. Meanwhile, since the specific surface area of the metal oxide is larger, the protective layer can increase roughness of the surface of the insulation layer, which has a function of enhancing the bonding force between the conductive layer and the insulation layer, such that the overall strength of the current collector can be enhanced.

The thickness of the lower protective layer is D3", and D3" satisfies: D3"≤1/10 D2 and 1 nm≤D3"≤200 nm, i.e., the thickness of the lower protective layer is smaller than or equal to 1/10 of the thickness D2 and is in a range of 1 nm to 200 nm.

In some embodiments, the protective layer can be arranged on the two opposite surfaces of the conductive layer, that is, both the upper protective layer and the lower protective layer are arranged.

In some embodiments, when both the upper protective layer and the lower protective layer are arranged, a proportional relationship between the thickness D3" of the lower protective layer and the thickness D3' of the upper protective layer is: ½ D3'≤D3"≤4/5 D3'. That is, the thickness of the upper protective layer is greater than the thickness of the lower protective layer. If the thickness of the lower protective layer is increased, it has little effect on improving the mechanical strength, safety performance, and the like of the current collector, but it can affect the weight energy density of the battery.

In the battery according to an embodiment of the present disclosure, the material of the conductive layer is aluminum, the thickness of the conductive layer is 500 nm≤D2≤1.5 m, the material of the protection layer is nickel oxide or aluminum oxide, and the protection layer is arranged on two opposite surfaces of the conductive layer.

FIGS. 1 to 4 are structural schematic diagrams of positive current collectors according to embodiments of the present disclosure.

In FIG. 1, the positive current collector 10 includes a positive insulation layer 101 and two positive conductive layers 102 provided above two opposite surfaces of the positive insulation layer 101. A positive protective layer 103, which is also referred as to an upper protective layer, is arranged on a surface of each positive conductive layer 102 facing away from the positive insulation layer 101.

Figure 2:
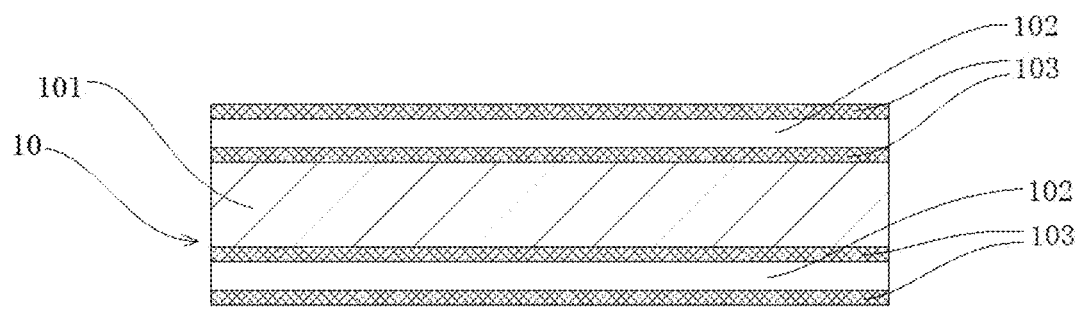
FIG. 2 is a structural schematic diagram of a positive current collector according to another embodiment of the present disclosure.

In FIG. 2, the positive current collector 10 includes a positive insulation layer 101 and two positive conductive layers 102 arranged on two opposite surfaces of the positive insulation layer 101. Two positive electrode protective layers 103 are arranged on two opposite surfaces of each positive conductive layer 102.

Figure 3:
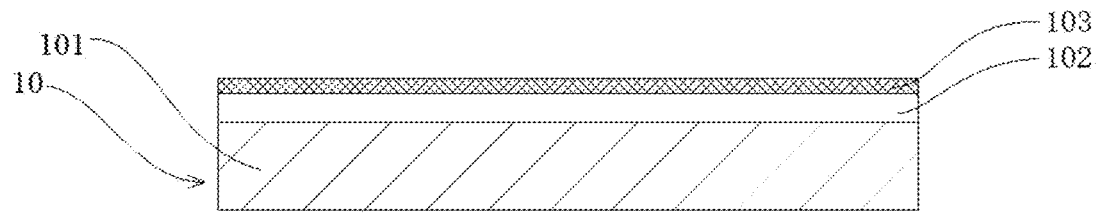
FIG. 3 is a structural schematic diagram of a positive current collector according to another embodiment of the present disclosure.

In FIG. 3, the positive current collector 10 includes a positive insulation layer 101 and a positive conductive layer 102 arranged on one surface of the positive insulation layer 101. A positive protective layer 103, which is also referred as to an upper protective layer, is arranged on a surface of the positive conductive layer 102 facing away from the positive insulation layer 101.

Figure 4:
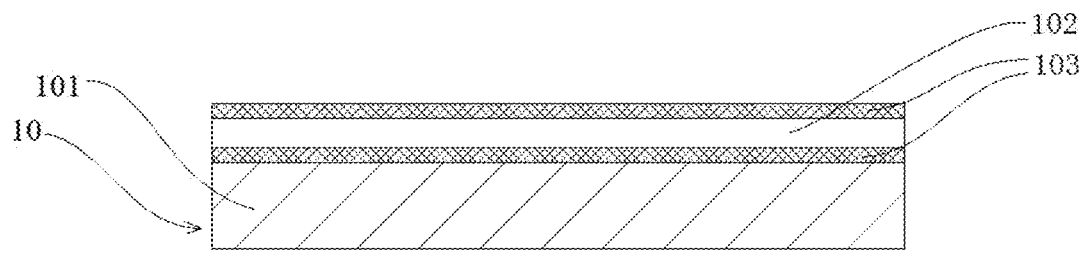
FIG. 4 is a structural schematic diagram of a positive current collector according to another embodiment of the present disclosure.

In FIG. 4, the positive current collector 10 includes a positive insulation layer 101 and a positive conductive layer 102 arranged on one surface of the positive insulation layer. Two positive protective layers 103 are arranged on two opposite surfaces of the positive conductive layer 102.

Figure 5:
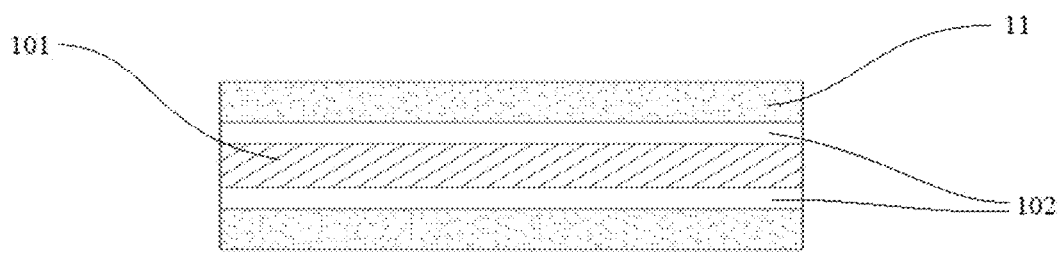
FIG. 5 is a structural schematic diagram of a positive electrode plate according to an embodiment of the present disclosure.
Figure 6:
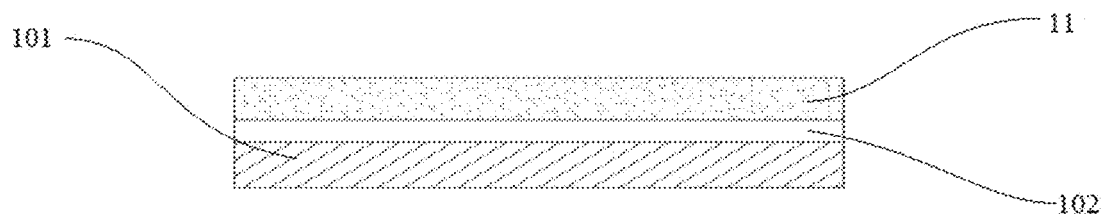
FIG. 6 is a structural schematic diagram of a positive electrode plate according to another embodiment of the present disclosure.

FIGS. 5 and 6 are structural schematic diagrams of a positive electrode plate according to embodiments of the present disclosure. As shown in FIGS. 5 and 6, the positive electrode plate 1 includes a positive current collector 10 and a positive active material layer 11 formed on a surface of the positive current collector 10. The positive current collector 10 includes a positive insulation layer 101 and one or two positive conductive layers 102 arranged in this order. There is one positive electrode protective layer 103 (not shown) arranged on one side of each positive conductive layer 102, or there are two positive electrode protective layers 103 (not shown) arranged on two sides of each positive conductive layer 102.

In the positive electrode plate, the positive active material layer includes a positive active material, a binder, and a conductive additive. Since the positive current collector has poorer conductivity than the conventional aluminum foil current collector, it is preferable that the mass percentage of the conductive additive is not smaller than 0.8 wt % based on a total weight of the positive active material layer. This can ensure that the polarization of the positive electrode plate is small such that it has small affection on the high rate performance of the battery. The higher the content of the conductive additive is, the smaller the polarization is and the better the rate performance of the battery will be. However, if the content of the conductive additive is too high, the charge and discharge capacity of the battery can be reduced. Therefore, it is preferable that the mass percentage of the conductive additive is 0.8 wt % to 2 wt %. Within this preferable range, the upper limit of adding the conductive additive can be 2 wt %, 1.8 wt %, 1.5 wt %, 1.3 wt %, or 1.2 wt %, and the lower limit of adding the conductive additive can be 0.8 wt %, 0.9 wt %, 0.95 wt %, 1.0 wt %, or 1.1 wt %.

In some embodiments, the conductive additive can be selected from common conductive agents for the electrode plate, such as conductive carbon black, graphene, carbon nanotube, KETJEN black, flake graphite, and the like.

In some embodiments of the present disclosure, the negative electrode plate of the battery includes a negative current collector and a negative active material layer. The negative current collector in the battery according to the embodiments of the present disclosure will be described in detail below.

The negative current collector of the battery according to the embodiments of the present disclosure uses a copper foil current collector having a thickness of 6 μm to 12 μm. In order to further increase the weight energy density of the entire battery, it is preferred to use a copper foil current collector having a thickness of 1.0 μm to 5.9 μm. This is because the positive current collector of the battery according to the present disclosure can improve safety performance of the battery, but its conductivity is inferior to that of the conventional aluminum foil current collector. Therefore, this embodiment of the present disclosure uses the copper foil current collector of the specific thickness along with the positive current collector. The negative current collector according to the embodiments of the present disclosure has good conductivity and a polarization of the electrode plate is small, such that the rate performance of the battery can be ensured and the negative electrode can be prevented from precipitating lithium.

Although selecting a copper foil current collector having a smaller thickness facilitates improving the weight energy density of the battery, in order to make the battery have both superior electrochemical performance and processability, preferably, the negative current collector is a copper foil current collector having a thickness of 2.0 μm to 5.9 μm, more preferably a copper foil current collector having a thickness of 3.0 μm to 5.9 μm, and even more preferably, a copper foil current collector having a thickness of 4.5 μm to 5.9 μm.

In the production process of applying the copper foil current collector, especially a thin copper foil current collector, to the battery product, it is preferable to use a copper foil current collector having an elongation at break greater than or equal to 1%. If the copper foil current collector has an elongation at break smaller than 1%, it is liable to be cracked or broken during processing and battery operation, thereby affecting the cost and long-term reliability of the battery. Preferably, a copper foil current collector having an elongation at break greater than or equal to 2% may be used. More preferably, a copper foil current collector having an elongation at break greater than or equal to 3% may be used.

Further, the copper foil current collector has an elongation at break greater than or equal to 1% both in the MD direction and the TD direction, so that the copper foil current collector has a certain mechanical strength while improving the weight energy density of the battery. It can be ensured that the copper foil has a good processing property during a manufacturing process of the battery. Also, the battery has good electrochemical properties and long-term reliability after the copper foil is applied to the battery. Preferably, a copper foil current collector having an elongation at break greater than or equal to 2% both in the MD direction and the TD direction is used. More preferably, a copper foil current collector having an elongation at break greater than or equal to 3% both in the MD direction and the TD direction is used.

In the present disclosure, the "length direction (MD direction)" and "width direction (TD direction)" of the copper foil current collector refer to two dimensions of a surface, respectively, in which the length direction refers to a main dimension direction (i.e., a direction having a larger size), and the width direction refers to a secondary dimension direction (i.e., a direction having a smaller size). Generally, the length direction is consistent with a coating direction of respective material layers (e.g., the electrode active material layer) during a manufacturing process of an electrode plate, and is also consistent with a winding direction of the electrode plate during a manufacturing process of an electrochemical device (e.g., a battery). The width direction is perpendicular to the length direction.

In the present disclosure, the copper foil current collector may be a current collector made of a metallic copper, or may be a current collector of a copper alloy such as a copper-nickel alloy, a copper-chromium alloy, a copper-zinc alloy, red copper, bronze, or the like. Preferably, the content of the copper element in the copper alloy is 90% by weight or more.

Further, the battery of the present disclosure is preferably a negative electrode plate having a following overcurrent capacity: a single piece of the negative electrode plate having a width of 50 mm, and a fusing time of 10 s or more at a current of 10 A. This is because when a thin copper foil current collector is used as the current collector, the negative electrode plate is also required to have a certain overcurrent capacity, otherwise it is easy to "blow" during an operation of the battery, thereby affecting the electrochemical performance and normal operation of the battery.

The test method for the overcurrent capacity of the negative electrode plate is as follows. The negative electrode plate was cut to a size shown in FIG. 10, and a current of 10 A was applied to observe the fusing time. The shorter the fusing time is, the worse its overcurrent capacity is.

It should be noted here that the elongation at break of the copper foil current collector is related to defects in the current collector, which are then related to the process of forming the current collector and its composition. Generally, the thinner the thickness of the copper foil current collector is, the more difficult the processing is and the more defects there are. This may also directly affect the overcurrent capacity of the negative electrode plate containing the copper foil current collector. Therefore, in order to make the battery have both high weight energy density and excellent electrochemical performance, it is necessary to use a thin copper foil current collector that has a large elongation at break and may lead to a good overcurrent capacity for the negative electrode plate.

In the battery according to the embodiments of the present disclosure, an electrolyte is further included. As an improvement in the embodiments of the present disclosure, in order to further improve the high rate performance of the battery, the room temperature conductivity of the electrolyte is 6.0 mS/cm to 9.0 mS/cm, which can further ensure that lithium is not precipitated from the negative electrode. The higher the room temperature conductivity of the electrolyte is, the better the rate performance of the battery is. However, if increasing the content of a certain type of organic solvent is merely for increasing the room temperature conductivity, the side reaction can be increased because the adding proportion of certain organic solvent is too large, and it may affect a cycle life of the battery to some extent.

If the room temperature conductivity of the electrolyte is too high, in an embodiment of the electrolyte, for example, the room temperature conductivity of the electrolyte can be adjusted by adjusting the proportion of the cyclic carbonate and the chain carbonate. If the room temperature conductivity is too high, it is needed to increase the addition amount of the cyclic carbonate, which may increase the side reaction. In addition, the room temperature conductivity can also be improved by adding carboxylic acid ester, and it is not limited to this manner.

According to the winding method, the battery according to the embodiments of the present disclosure can be of a wound type or a laminated type. The battery can also be one of a lithium ion secondary battery, a primary lithium battery, a sodium ion battery, and a magnesium ion battery. However, it is not limited to these batteries.

Figure 7:
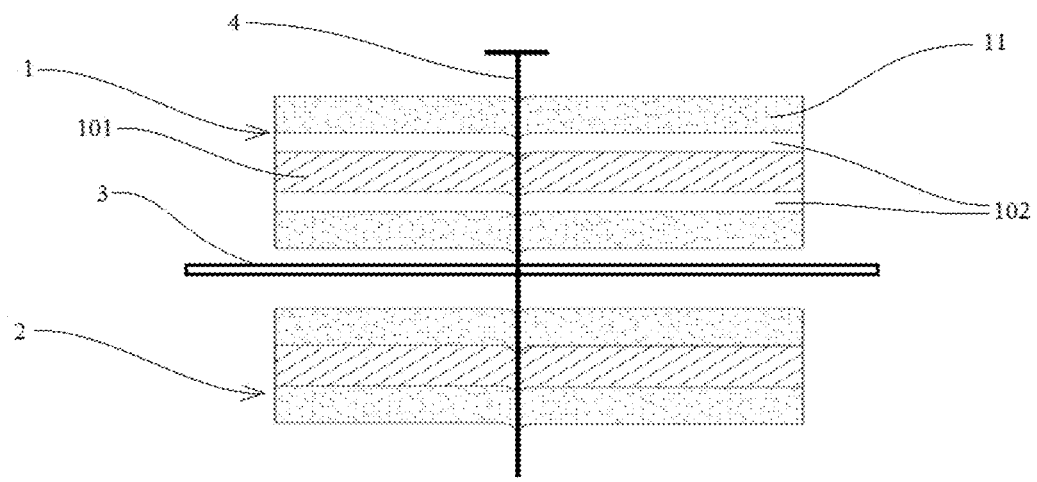
FIG. 7 is a schematic diagram showing a one-time nailing experiment of the present disclosure.

In the embodiments of the present disclosure, a nailing experiment is used to simulate the abnormal conditions of the battery and observe a change of the battery after nailing. FIG. 7 is a schematic diagram of a one-time nailing experiment of the present disclosure. For the sake of simplicity, the drawing merely shows that a nail 4 punctures one layer of positive electrode plate 1, one layer of separator 3 and one layer of negative electrode plate 2 of the battery. It should be noted that the nail 4 penetrates the entire battery in the actual nailing experiment. The entire battery generally includes a plurality of layers of positive electrode plate 1, separator 3, and negative electrode plate 2. When a short circuit occurs in the battery due to the nailing, the short circuit current is greatly reduced, and the heat generated during the short circuit is controlled within a range that the battery can fully absorb. Therefore, the heat generated at the position where the internal short circuit occurs can be completely absorbed by the battery, and the temperature rise of the battery is also very small, such that the damage on the battery caused by the short circuit can be limited to the nailing position, and only a "point break" can be formed without affecting the normal operation of the battery in a short time.

Embodiment 1

1. Preparation of Positive Current Collector

An insulation layer having a certain thickness is selected, and a conductive layer having a certain thickness is formed on the surface of the insulation layer by means of vacuum evaporation, mechanical rolling or bonding, and the protective layer is formed by means of vapor deposition, in-situ formation or coating.

1.1 Formation of Conductive Layer

There are several manners to form the conductive layer as follows.

(1) The conditions of the vacuum evaporation for forming the conductive layer are as follows: the insulation layer is placed in a vacuum evaporation chamber after a surface cleaning treatment, a high-purity metal wire in a metal evaporation chamber is melted and evaporated at a high temperature in a range of 1600° C. to 2000° C., the evaporated metal passes through a cooling system in the vacuum evaporation chamber and is finally deposited on the surface of the insulation layer to form the conductive layer.

(2) The conditions of the mechanical rolling for forming the conductive layer are as follows: a foil of a material used for the conductive layer is placed in a mechanical roller, rolled to a predetermined thickness by applying a pressure in a range of 20 t to 40 t, and then placed on a surface of the insulation layer that has been subjected to a surface cleaning treatment, and finally the both are placed in the mechanical roller, so as to be tightly bonded by applying a pressure in a range of 30 t to 50 t.

(3) The conditions of the bonding for forming the conductive layer are as follows: a foil of a material used for the conductive layer is placed in a mechanical roller, rolled to a predetermined thickness by applying a pressure in a range of 20 t to 40 t, and then a mixed solution of PVDF and NMP is applied on a surface of the insulation layer that has been subjected to a surface cleaning treatment, and finally the conductive layer having the above predetermined thickness is bonded to the surface of the insulation layer and dried at 100° C.

1.2 Formation of Protective Layer

There are several manners to form a protective layer as follows.

(1) A protective layer is firstly arranged on a surface of the insulation layer by means of vapor deposition or coating, and then a conductive layer having a certain thickness is formed on the protective layer disposed on the insulation layer by means of vacuum evaporation, mechanical rolling or bonding, so as to prepare a current collector having a lower protective layer (the protective layer is located between the insulation layer and the conductive layer). In addition, alternatively, on the basis of the above, an upper protective layer is further formed on a surface of the conductive layer facing away from the insulation layer by means of vapor deposition, in-situ formation or coating, so as to prepare a current collector having an upper protective layer and a lower protective layer (which are located on two opposite surfaces of the conductive layer).

(2) A protective layer is firstly formed on a surface of the conductive layer by means of vapor deposition, in-situ formation, or coating, and then the conductive layer provided with the above protective layer is arranged on a surface of the insulation layer by means of mechanical rolling or bonding, and the protective layer is arranged between the insulation layer and the conductive layer, so as to prepare a current collector having a lower protective layer (the protective layer is located between the insulation layer and the conductive layer). In addition, alternatively, on the basis of the above, an upper protective layer is further formed on a surface of the conductive layer facing away from the insulation layer by means of vapor deposition method, in-situ formation, or coating, so as to prepare a current collector having an upper protective layer and a lower protective layer (which are located on two opposite surfaces of the conductive layer);

(3) A protective layer is firstly formed on a surface of the conductive layer by means of vapor deposition, in-situ formation, or coating, and then the conductive layer provided with the above protective layer is arranged on a surface of the insulation layer by means of mechanical rolling or bonding, and the protective layer is arranged on a surface of the conductive layer facing away from the insulation layer, so as to prepare a current collector having an upper protective layer (which is located on the surface of the conductive layer facing away from the insulation layer);

(4) A protective layer is firstly formed on two surfaces of the conductive layer by means of vapor deposition, in-situ formation, or coating, and then the conductive layer provided with the above protective layer is arranged on the surface of the insulation layer by means of mechanical rolling or bonding, so as to prepare a current collector having an upper protective layer and a lower protective layer (which are located on two opposite surfaces of the conductive layer);

(5) A conductive layer is formed on the surface of an insulation layer, and then an upper protective layer is formed on the surface of the conductive layer facing away from the insulation layer by means of vapor deposition, in-situ formation, or coating, so as to prepare a current collector having an upper protective layer (which is located on the surface of the conductive layer facing away from the insulation layer).

In the embodiments of preparation, the vapor deposition is vacuum evaporation, the in-situ formation is in-situ passivation, and the coating is blade coating.

The conditions of the vacuum evaporation for forming the protective layer are as follows: a sample is placed in a vacuum evaporation chamber after a surface cleaning treatment, a material of the protective layer in the evaporation chamber is melted and evaporated at a high temperature in a range of 1600° C. to 2000° C., and the evaporated material of the protective layer passes through a cooling system in the vacuum evaporation chamber and is finally deposited on a surface of the sample, so as to form the protective layer.

The conditions of the in-situ passivation are as follows: the conductive layer is placed in a high-temperature oxidizing environment, the temperature is controlled within a range of 160° C. to 250° C., and the oxygen supply is maintained in the high-temperature environment, and processing time is 30 min, so as to form a protective layer of metal oxide.

The conditions of the gravure coating are as follows: a material of the protective layer and NMP are stirred and mixed, then the slurry of the above material of the protective layer (solid material content is 20% to 75%) is coated on a surface of the sample, the thickness of the coating is controlled by a gravure roll, and finally the coating is dried at 100 to 130° C.

2. Negative Current Collector

A copper foil having a thickness of 8 μm is selected as a negative electrode collector (i.e., negative electrode plate 1#).

3. Preparation of Electrode Plate:

The positive electrode slurry or the negative electrode slurry is coated on a surface of the current collector by a conventional coating process of battery and dried at 100° C., so as to obtain a positive electrode plate or negative electrode plate. Here, the mass percentage of the conductive additive (conductive carbon black) is not smaller than 0.8 wt % based on the total weight of the positive active material layer.

Specific parameters of the prepared positive electrode plate are shown in Tables 1 and 2. In Table 2, Positive Electrode Plate 1-1 represents an electrode plate obtained by preparing a corresponding protective layer on Positive Electrode Plate 1, and so on.

The current collector of the conventional positive electrode plate is an Al foil having a thickness of 12 μm, the positive active material layer is a ternary (NCM) material layer of 55 μm, and the mass percentage of the conductive additive is 1.5 wt %.

Negative electrode plate: The negative current collector is a Cu foil having a certain thickness, and the negative active material layer is a graphite material layer of 55 μm.

4. Preparation of Electrolyte

Ethylene carbonate (EC) and ethyl methyl carbonate (EMC) are used as organic solvents (EC: EMC in a volume ratio of 1:10 to 10:1); the electrolyte is $LiPF_6$ and the concentration of $LiPF_6$ is 1 mol/L.

By adjusting the volume ratio of EC and EMC, electrolytes having a room temperature conductivity of 6.5 mS/cm, 7.0 mS/cm, 7.3 mS/cm, 8.0 mS/cm, 8.5 mS/cm, or 9.0 mS/cm are prepared respectively for the preparation of the battery.

5. Preparation of the Battery:

A positive electrode plate, a PP/PE/PP separator and a negative electrode plate are wound together to form a bare cell by a conventional battery manufacturing process, then the bare cell is placed into a battery case, an electrolyte is injected into the case, followed by sealing, formation, and the like, so as to obtain a lithium ion battery. The standard battery capacity (25° C., 1 C/1 C) is 3.2 Ah.

Specific compositions of the lithium ion battery prepared in the embodiments of the present disclosure and the batteries of the comparative examples are shown in Table 3.

TABLE 2

| Electrode plate No. | Positive current collector | | | | | | Positive active material layer Content of the conductive agent |
|---|---|---|---|---|---|---|---|
| | Insulation layer | | Conductive layer | | Electrode active material layer | | |
| | Material | D1 | Material | D2 | Material | Thickness | |
| Positive electrode plate 1# | PI | 2 μm | Al | 800 nm | NCM | 55 μm | 1.5 wt % |
| Positive electrode plate 2# | PI | 5 μm | Al | 2 μm | NCM | 55 μm | 1.5 wt % |
| Positive electrode plate 3# | PI | 6 μm | Al | 300 nm | NCM | 55 μm | 1.5 wt % |
| Positive electrode plate 4# | PET | 5 μm | Al | 500 nm | LCO | 55 μm | 1.3 wt % |
| Positive electrode plate 5# | PET | 10 μm | Al | 1 μm | NCM | 55 μm | 1.2 wt % |
| Positive electrode plate 6# | PET | 8 μm | Ni | 1.5 μm | LCO | 55 μm | 0.8 wt % |

TABLE 2

| Electrode plate No. | Lower protective layer | | Upper protective layer | |
|---|---|---|---|---|
| | Material | D3" | Material | D3' |
| Positive electrode plate 1-1# | / | / | nickel oxide | 1 nm |
| Positive electrode plate 1-2# | / | / | nickel oxide | 10 nm |
| Positive electrode plate 1-3# | / | / | aluminum oxide | 50 nm |
| Positive electrode plate 2-4# | / | / | nickel oxide | 200 nm |
| Positive electrode plate | nickel oxide | 5 nm | nickel oxide | 10 nm |

TABLE 2-continued

| | Lower protective layer | | Upper protective layer | |
|---|---|---|---|---|
| Electrode plate No. | Material | D3" | Material | D3' |
| Positive electrode plate 1-5# | nickel oxide | 8 nm | nickel oxide | 10 nm |
| Positive electrode plate 1-6# | nickel oxide | 20 nm | nickel oxide | 50 nm |
| Positive electrode plate 1-7# | nickel oxide | 30 nm | nickel oxide | 50 nm |
| Positive electrode plate 2-8# | nickel oxide | 50 nm | nickel oxide | 100 nm |
| Positive electrode plate 2-9# | aluminum oxide | 100 nm | nickel oxide | 200 nm |
| Positive electrode plate 2-10# | | | | |

The symbol "/" indicates that no protective layer is arranged.

TABLE 3

| Battery No. | Composition of the electrode plate | | Electrolyte Room temperature electric conductivity (mS/cm) |
|---|---|---|---|
| Battery 1# | Conventional positive electrode plate | Negative electrode plate 1# | 6.5 |
| Battery 2# | Positive electrode plate 1# | Negative electrode plate 1# | 7.0 |
| Battery 3# | Positive electrode plate 2# | Negative electrode plate 1# | 8.0 |
| Battery 4# | Positive electrode plate 1-1# | Negative electrode plate 1# | 6.0 |
| Battery 5# | Positive electrode plate 1-2# | Negative electrode plate 1# | 8.0 |
| Battery 6# | Positive electrode plate 1-3# | Negative electrode plate 1# | 7.0 |
| Battery 7# | Positive electrode plate 2-4# | Negative electrode plate 1# | 8.0 |
| Battery 8# | Positive electrode plate 1-5# | Negative electrode plate 1# | 8.0 |
| Battery 9# | Positive electrode plate 1-6# | Negative electrode plate 1# | 8.5 |
| Battery 10# | Positive electrode plate 1-7# | Negative electrode plate 1# | 8.0 |
| Battery 11# | Positive electrode plate 2-8# | Negative electrode plate 1# | 7.3 |
| Battery 12# | Positive electrode plate 2-9# | Negative electrode plate 1# | 8.0 |
| Battery 13# | Positive electrode plate 2-10# | Negative electrode plate 1# | 9.0 |

Experimental 2

1. Test Method of the Batteries:

A method for testing cycle life of the lithium ion battery was performed as follows.

A lithium ion battery was charged and discharged at 25° C. and 45° C. respectively, that is, it was firstly charged with a current of 1 C to a voltage of 4.2V, then discharged with a current of 1 C to a voltage of 2.8V, and the discharge capacity after a first cycle was recorded; and the battery was subjected to 1000 cycles of 1 C/1 C charging-discharging, and the discharge capacity of the battery after a 1000$^{th}$ cycle was recorded. A capacity retention rate after the 1000$^{th}$ cycle was obtained by dividing the discharge capacity after the 1000$^{th}$ cycle by the discharge capacity after the first cycle.

The experimental results are shown in Table 4.

2. Test Methods of One-Time Nailing Experiment and Six Consecutive Nailing Experiment:

(1) One-time nailing experiment: a battery that had been fully charged was fixed, a steel needle with a diameter of 8 mm penetrates punctured through the battery at a speed of 25 mm/s at room temperature and remained in the battery, and the battery was observed and measured after the nailing was finished.

(2) Six-time nailing experiment: a battery that had been fully charged was fixed, six steel needles with a diameter of 8 mm rapidly punctured through the battery successively at a speed of 25 mm/s at room temperature and remained in the battery, and the battery was observed and measured after the nailing was finished.

(3) Measurement of battery temperature: a multichannel thermometer was used, and the temperature-sensing wires were respectively attached on geometric centers of a nail-inserting surface and an opposite surface of the battery to be nailed; after the nailing was finished, temperature of the battery was measured and tracked for 5 minutes, and the temperature of the battery at the end of the 5 minutes was recorded.

(4) Measurement of battery voltage: positive and negative electrodes of each battery to be nailed were connected to test terminals of an internal resistance instrument; after the nailing was finished, a voltage of each battery was measured and tracked for 5 minutes, and the voltage of the battery at the end of 5 minutes was recorded.

The data of the recorded battery temperatures and voltages are shown in Table 5.

3. Rate Experiment

A rate experiment was performed for the lithium ion battery. The specific test method was performed as follows.

The lithium ion battery was charged and discharged at 25° C., i.e., the battery was firstly charged with a current of 1 C to a voltage of 4.2V, and then was discharged with a current of 1 C to a voltage of 2.8V. The discharge capacity after the first cycle was recorded and divided by the discharge capacity at 25° C. with 1 C/1 C charge-discharge after the first cycle to obtain a 4 C rate performance of the battery.

The experimental results are shown in Table 6.

TABLE 4

| | Capacity retention ratio after the 1000$^{th}$ cycle (1 C/1 C) | |
|---|---|---|
| Battery No. | 25° C. | 45° C. |
| Battery 1# | 89.2% | 86.5% |
| Battery 2# | 86.5% | 80.7% |
| Battery 3# | 86.8% | 80.8% |
| Battery 4# | 87.7% | 81.9% |
| Battery 5# | 88.2% | 83.2% |
| Battery 6# | 88.7% | 86.2% |
| Battery 7# | 88.9% | 86.0% |
| Battery 8# | 88.2% | 82.8% |
| Battery 9# | 88.5% | 85.2% |
| Battery 10# | 88.7% | 85.3% |
| Battery 11# | 88.6% | 85.7% |
| Battery 12# | 88.9% | 86.2% |
| Battery 13# | 89.1% | 86.1% |

TABLE 5

| | One-time nailing experiment | | Six-time consecutive nailing experiment | |
|---|---|---|---|---|
| Battery No. | Battery temperature rise (° C.) | Battery voltage (V) | Battery temperature rise (° C.) | Battery voltage (V) |
| Battery 1# | 500 | 0 | N/A | N/A |
| Battery 2# | 13.2 | 3.82 | 15.4 | 3.95 |

TABLE 5-continued

| | One-time nailing experiment | | Six-time consecutive nailing experiment | |
|---|---|---|---|---|
| Battery No. | Battery temperature rise (° C.) | Battery voltage (V) | Battery temperature rise (° C.) | Battery voltage (V) |
| Battery 3# | 15.2 | 3.85 | 15.7 | 3.84 |
| Battery 4# | 5.4 | 4.12 | 3.6 | 4.08 |
| Battery 5# | 4.9 | 4.14 | 3.4 | 4.08 |
| Battery 6# | 4.3 | 4.11 | 3.4 | 4.09 |
| Battery 7# | 4.9 | 4.05 | 4.4 | 4.12 |
| Battery 8# | 3.9 | 4.12 | 4.1 | 4.12 |
| Battery 9# | 5.1 | 4.13 | 4.0 | 4.04 |
| Battery 10# | 4.4 | 4.11 | 3.6 | 4.05 |
| Battery 11# | 5.6 | 4.14 | 4.5 | 4.08 |
| Battery 12# | 5.1 | 4.12 | 4.5 | 4.09 |
| Battery 13# | 4.7 | 4.12 | 4.1 | 4.12 |

Note:
"N/A" indicates that thermal runaway and damage happened immediately after one steel needle punctured through the battery.

TABLE 6

| Battery No. | 4 C rate performance |
|---|---|
| Battery 1# | 46.0% |
| Battery 2# | 43.4% |
| Battery 4# | 43.3% |

Figure 8:
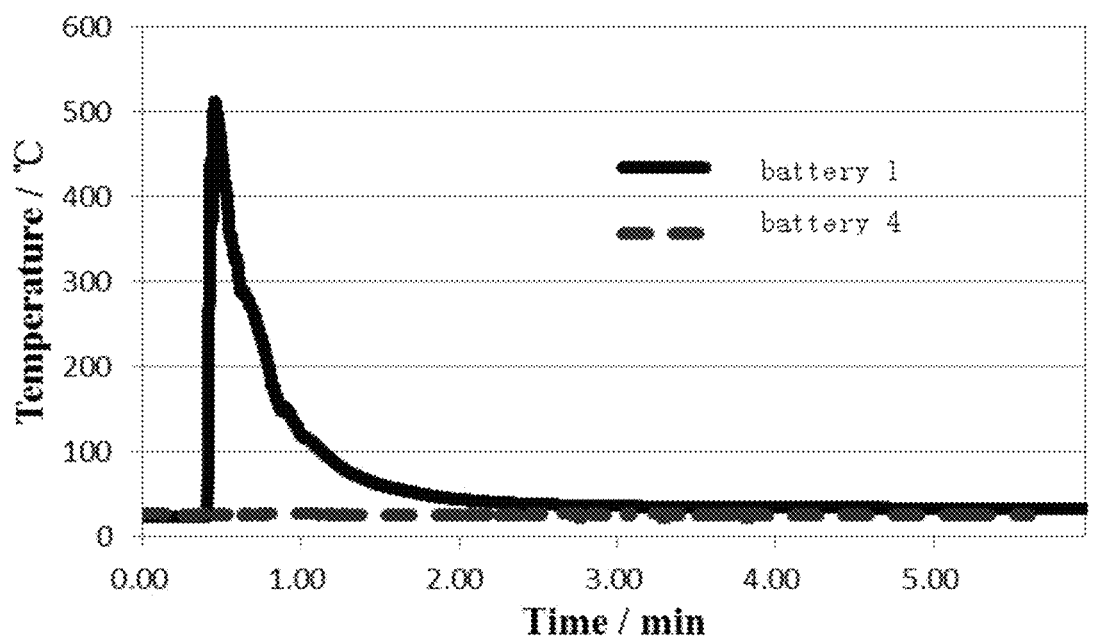
FIG. 8 is a schematic graph of temperatures of Battery 1 and Battery 4 after the one-time nailing experiment.
Figure 9:
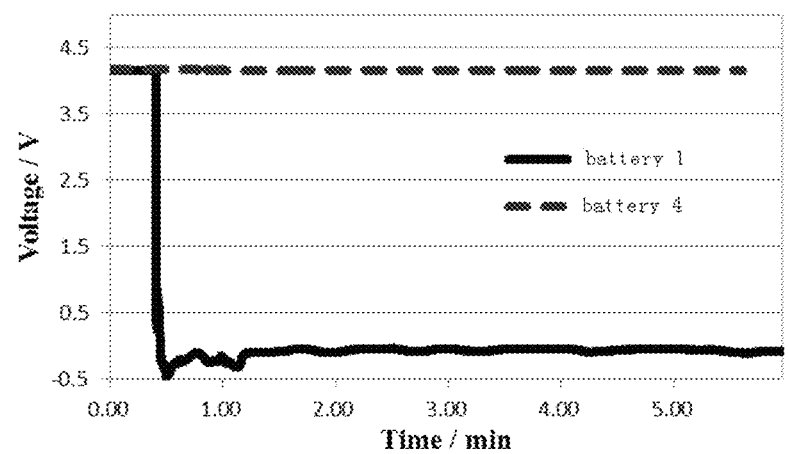
FIG. 9 is a schematic graph of voltages of Battery 1 and Battery 4 after the one-time nailing experiment.

The graph of temperature of Battery 1# and Battery 4# with time is shown in FIG. 8, and the graph of voltage with time is shown in FIG. 9.

According to the results in Table 5, compared with Battery 1# using the conventional positive electrode plate and the conventional negative electrode plate, the battery according to the embodiments of the present disclosure has good cycle performance, which is equivalent to the cycle performance of the conventional battery. This shows that the current collectors according to the embodiments of the present disclosure do not have any significant adverse effects on the resulting electrode plates and batteries. Compared with a current collector having no protective layer, the battery prepared by the current collector provided with the protective layer can have a further improved capacity retention rate, indicating a better reliability of the battery.

In addition, the battery according to the embodiments of the present disclosure can have good safety performance. From the results in Table 6 and FIGS. 8 and 9, the battery temperature of Battery 1# (conventional battery) at the moment of nailing rose suddenly by hundreds of centigrade degree and the voltage thereof suddenly dropped to zero. This shows that the internal short circuit occurred in the battery at the moment of nailing, a large amount of heat was generated, a thermal runaway and damage of the battery instantly occurred, such that the battery is unable to continue operating. Furthermore, due to the thermal runaway and damage of the battery occurring immediately after the first steel needle punctured into the battery, it is impossible to perform the continuous nailing on this type of battery by using six steel needles.

With the battery according to the embodiments of the present disclosure, the temperature rise of the battery can basically be controlled under 6° C., the voltages are substantially constant, and the battery can operate normally, no matter in one-time nailing experiment or in six-time continuous nailing experiment. Moreover, the battery provided with a protective layer made of a metal oxide material can have the better safety performance. Thus, in the event of an internal short circuit in the battery, the battery according to the embodiments of the present disclosure can greatly reduce the heat generation caused by the short circuit, thereby improving the safety performance of the battery. In addition, the damage on the battery caused by the short circuit can be limited to a "point", and thus merely forms a "point break", without affecting the normal operation of the battery in a short time.

According to the results in Table 6, using the negative current collector within the thickness range of the present disclosure, the conductive additive within the content range of the present disclosure and the electrolyte within the parameters of the present disclosure can achieve good rate performance. The battery according to the embodiments of the present disclosure has good rate performance comparable to a conventional battery.

Embodiment 3

Different from Example 1, a copper foil having a thickness of 1 μm to 12 μm is selected as the negative electrode current collector.

1. Test for Elongation at Break of the Negative Current Collector:

Nine types of negative electrode current collectors with a thicknesses ranging from 1 μm to 12 μm were selected, and two negative electrode current collector samples having a length of 200 mm and a width of 15 mm were taken on a negative current collector. Then, the negative electrode current collector sample was fixed on a tensile machine (Model AI7000), an initial length L0 was recorded, the tensile machine was started until the negative electrode current collector sample was broken, and then a displacement distance L1 of the negative electrode current collector sample at the time of being broken was read from the tensile machine. An average values obtained from two tests is a test result. The elongation at break=(L1−L0)/L0*100%.

The data on the elongation at break of the negative electrode current collector is shown in Table 7.

Figure 10:
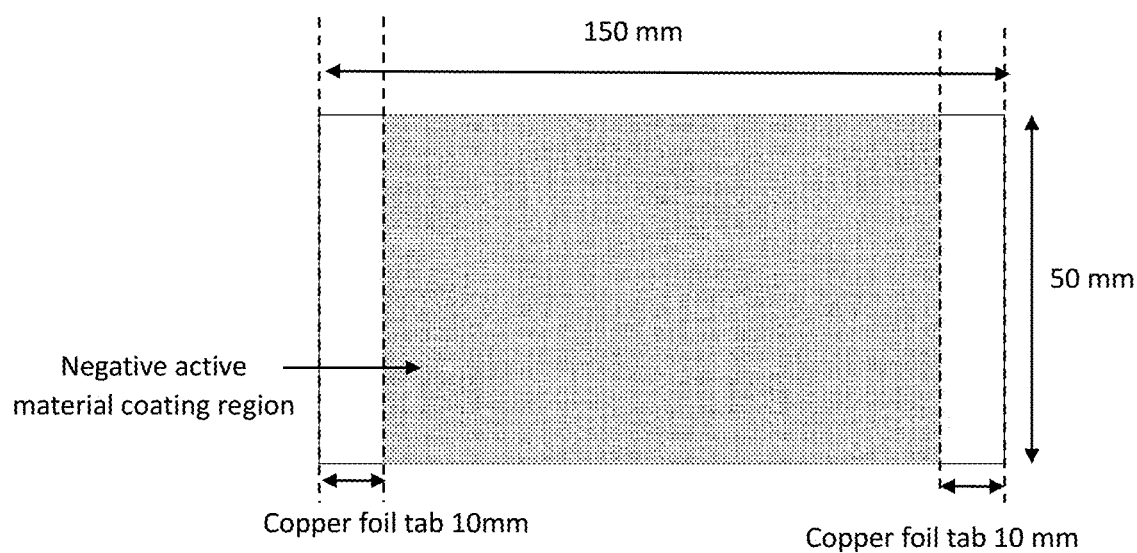
FIG. 10 is a sectional view showing cutting of a negative electrode plate according to an embodiment of the present disclosure.

2. Test for the Overcurrent Capacity of the Negative Current Collector:

Nine types of negative electrode plates having a thickness of 1 μm to 12 μm were cut into the sizes as shown in FIG. 10, and a current of 10 A was applied to observe the fusing time. The data on the fusing time for the negative current collector is shown in Table 7. It should be noted that the overcurrent capacity of the electrode plate is related to a width of the electrode plate after cutting. The influence of the width of the tab, the length of the electrode plate and the type of active material on the overcurrent capacity is negligible. An example is shown in FIG. 10.

3. Preparation of the Battery:

In the conventional battery manufacturing process, the positive electrode plates 2-9, the PP/PE/PP separators and the negative electrode plates 1# to 9# in Embodiment 1 were respectively wound into a bare cell, which was then placed into the battery housing. An electrolyte was then injected, followed by sealing and chemical conversion and the like, and finally a lithium ion battery was obtained. The standard battery capacity (25° C., 1 C/1 C) is 3.2 Ah.

The specific compositions of the lithium ion battery and the comparative lithium ion battery manufacture in the present disclosure are shown in Table 8.

4. A method for testing cycle life of the lithium ion battery was performed as follows.

A lithium ion battery was charged and discharged at a temperature of 25° C.±2° C., that is, it was firstly charged with a current of 1 C to a voltage of 4.2V, then discharged with a current of 1 C to a voltage of 2.8V, and the discharge capacity after a first cycle was recorded; and the battery was subjected to 1000 cycles of 1 C/1 C charging-discharging, and the discharge capacity of the battery after a $1000^{th}$ cycle was recorded. A capacity retention rate after the $1000^{th}$ cycle was obtained by dividing the discharge capacity after the $1000^{th}$ cycle by the discharge capacity after the first cycle.

The experimental results are shown in Table 9.

TABLE 7

| Electrode plate No. | Negative current collector | | | Overcurrent capacity of the negative electrode plate at 10 A fusing time (s) |
|---|---|---|---|---|
| | Material | Thickness | Elongation at break (%) | |
| Negative electrode plate 1# | Cu | 8 μm | 6.0 | >1000 |
| Negative electrode plate 2# | Cu | 1 μm | 1.0 | 15 |
| Negative electrode plate 3# | Cu | 2 μm | 1.5 | 191 |
| Negative electrode plate 4# | Cu | 3 μm | 2 | >1000 |
| Negative electrode plate 5# | Copper alloy | 4 μm | 2.1 | >1000 |
| Negative electrode plate 6# | Cu | 4.5 μm | 2.5 | >1000 |
| Negative electrode plate 7# | Cu | 5.6 μm | 3.0 | >1000 |
| Negative electrode plate 8# | Cu | 5.9 μm | 2.8 | >1000 |
| Negative electrode plate 9# | Cu | 12 μm | 6.5 | >1000 |

Among them, the composition of the copper alloy used for the negative electrode plate 5# is 95 wt % of copper and 5 wt % of nickel.

TABLE 8

| Battery No. | Composition of electrode plate | | Electrolyte Conductivity at normal temperature (mS/cm) |
|---|---|---|---|
| Battery 12# | Positive electrode plate 2-9# | Negative electrode plate 1# | 8.0 |
| Battery 22# | Positive electrode plate 2-9# | Negative electrode plate 2# | 8.0 |
| Battery 23# | Positive electrode plate 2-9# | Negative electrode plate 3# | 8.0 |
| Battery 24# | Positive electrode plate 2-9# | Negative electrode plate 4# | 8.0 |
| Battery 25# | Positive electrode plate 2-9# | Negative electrode plate 5# | 8.0 |
| Battery 26# | Positive electrode plate 2-9# | Negative electrode plate 6# | 8.0 |
| Battery 27# | Positive electrode plate 2-9# | Negative electrode plate 7# | 8.0 |
| Battery 28# | Positive electrode plate 2-9# | Negative electrode plate 8# | 8.0 |
| Battery 9# | Positive electrode plate 2-9# | Negative electrode plate 9# | 8.0 |

TABLE 9

| Battery No. | Weight energy density (wh/kg) | Capacity retention ratio (%) after the 1000th cycle at 25° C. |
|---|---|---|
| Battery 12# | 248 | 88.9 |
| Battery 22# | 264 | 21.2 |
| Battery 23# | 261 | 29.7 |
| Battery 24# | 258 | 48.3 |
| Battery 25# | 257 | 69.9 |
| Battery 26# | 257 | 75.4 |
| Battery 27# | 252 | 90.2 |
| Battery 28# | 252 | 89.7 |
| Battery 9# | 240 | 89.9 |

According to the results in Tables 7-9, the copper foil current collector of the negative electrode plates 2# to 8# is thinner than that of the negative electrode plate 1#, and therefore, the copper foil current collector having the thickness of 1 μm to 5.9 μm can meet the requirements of elongation at break (elongation at break ≥1%), so that the copper foil current collector has a certain mechanical strength to ensure good processing property of the copper foil during battery manufacturing.

In the copper foil current collector of the negative electrode plates 2# to 8#, the negative electrode plate 2# and the negative electrode plate 3# have a short fusing time and a poor overcurrent capacity. Therefore, the copper foil current collector having a thickness of 2.0 μm to 5.9 μm has a thin thickness, a large elongation at break, a long fusing time, and a good overcurrent capacity.

In addition, as can be seen from the results of Table 9, the lithium ion battery formed by the negative electrode plates 2#~8# has a weight energy density of 250 wh/kg or higher, and compared to the lithium ion battery formed by the negative electrode plate 1# or the negative electrode plate 9#, it can effectively increase the weight energy density, and as the thickness of the copper foil current collector increases, the cycle stability of the battery is also gradually improved.

The preferable embodiments of the present disclosure are disclosed above but are not used to limit the claims. Those skilled in the art may make possible changes and modifications without departing from the concept of the present disclosure. Therefore, the protection scope of the present disclosure is defined by the attached claims.

What is claimed is:

1. A battery, comprising
a positive electrode plate comprising a positive current collector and a positive active material layer;
a negative electrode plate comprising a negative current collector and a negative active material layer, and
an electrolyte,
wherein the positive current collector comprises an insulation layer and at least one conductive layer, the insulation layer is used to support the at least one conductive layer, each of the at least one conductive layer is used to support the positive active material layer and is located above at least one surface of the insulation layer, and each of the at least one conductive layer has a thickness of D2 satisfying: 300 nm≤D2≤2 μm,
wherein at least one protective layer is arranged on at least one surface of each of the at least one conductive layer, and
wherein the negative current collector is a copper foil current collector having a thickness of 1 μm to 5.9 μm,
the at least one protective layer is made of aluminum oxide, cobalt oxide, chromium oxide, nickel oxide, or combinations thereof, and the at least one protective layer includes a first protective layer arranged on a surface of one of the at least one conductive layer facing the insulation layer, and a second protective layer arranged on a surface of one of the at least one conductive layer facing away from the insulation layer, and a thickness of the second protective layer is greater than a thickness of the first protective layer.

2. The battery according to claim 1, wherein the at least one conductive layer is made of a metallic conductive material, and the metallic conductive material is selected from a group consisting of aluminum, copper, nickel, titanium, silver, nickel-copper alloy, aluminum-zirconium alloy, or combinations thereof.

3. The battery according to claim 1, wherein each of the at least one protective layer has a thickness of D3 satisfying: D3≤1/10 D2 and 1 nm≤D3≤200 nm.

4. The battery according to claim 1, wherein the positive active material layer comprises a positive active material, a binder, and a conductive additive, and wherein a mass percentage of the conductive additive to the positive active material layer is larger than or equal to 0.8 wt %.

5. The battery according to claim 1, wherein the electrolyte has a room temperature conductivity of 6.0 mS/cm to 9.0 mS/cm.

6. The battery according to claim 1, wherein the at least one conductive layer is made of aluminum, and the thickness of the conductive layer satisfies 500 nm ≤D2 ≤1.5 µm.

7. The battery according to claim 1, wherein the insulation layer has a thickness of D1 satisfying: 1 µm≤D1≤20 µm;

the insulation layer is made of an organic polymer insulation material, and the organic polymer insulation material is selected from a group consisting of polyamide, polyethylene terephthalate, polyimide, polyethylene, polypropylene, polystyrene, polyvinyl chloride, acrylonitrile-butadiene-styrene copolymer, polybutylene terephthalate, poly-p-phenylene terephthalamide, ethylene propylene rubber, polyformaldehyde, epoxy resin, phenol-formaldehyde resin, polytetrafluoroethylene, polyvinylidene fluoride, silicone rubber, polycarbonate, or combinations thereof.

8. The battery according to claim 1, wherein the negative current collector is a copper foil current collector having a thickness of 2.0 µm to 5.9 µm.

9. The battery according to claim 1, wherein an overcurrent capacity of the negative electrode plate includes a fusing time at 10A greater than or equal to 10 seconds for a single piece of the negative electrode plate having a width of 50 mm.

10. The battery according to claim 1, wherein each of the at least one protective layer has a thickness of D3 satisfying: D3≤1/10 D2 and 10 nm≤D3≤50 nm.

11. The battery according to claim 1, wherein the insulation layer has a thickness of D1 satisfying: 2 µm≤D1≤10 µm, and wherein the insulation layer is made of an organic polymer insulation material, and the organic polymer insulation material is selected from a group consisting of polyamide, polyethylene terephthalate, polyimide, polyethylene, polypropylene, polystyrene, polyvinyl chloride, acrylonitrile-butadiene-styrene copolymer, polybutylene terephthalate, poly-p-phenylene terephthalamide, ethylene propylene rubber, polyformaldehyde, epoxy resin, phenol-formaldehyde resin, polytetrafluoroethylene, polyvinylidene fluoride, silicone rubber, polycarbonate, or combinations thereof.

12. The battery according to claim 1, wherein the insulation layer has a thickness of D1 satisfying: 2 µm≤D1≤6 µm, and wherein the insulation layer is made of an organic polymer insulation material, and the organic polymer insulation material is selected from a group consisting of polyamide, polyethylene terephthalate, polyimide, polyethylene, polypropylene, polystyrene, polyvinyl chloride, acrylonitrile-butadiene-styrene copolymer, polybutylene terephthalate, poly-p-phenylene terephthalamide, ethylene propylene rubber, polyformaldehyde, epoxy resin, phenol-formaldehyde resin, polytetrafluoroethylene, polyvinylidene fluoride, silicone rubber, polycarbonate, or combinations thereof.

13. The battery according to claim 1, wherein the negative current collector is a copper foil current collector having a thickness of 3.0 µm to 5.9 µm.

14. The battery according to claim 1, wherein the negative current collector is a copper foil current collector having a thickness of 4.5 µm to 5.9 µm.

15. The battery according to claim 1, wherein the copper foil current collector has an elongation at break greater than or equal to 1%.

16. The battery according to claim 1, wherein the copper foil current collector has an elongation at break greater or equal to 2%.

17. The battery according to claim 1, wherein the copper foil current collector has an elongation at break greater than or equal to 3%.

18. The battery according to claim 1, wherein both in a MD direction and a TD direction, the copper foil current collector has an elongation at break greater than or equal to 1%.

19. The battery according to claim 1, wherein both in a MD direction and a TD direction, the copper foil current collector has an elongation at break greater than or equal to 2%.

20. The battery according to claim 1, wherein both in a MD direction and a TD direction, the copper foil current collector has an elongation at break greater than or equal to 3%.

* * * * *